United States Patent
Yoshida (10) Patent No.: US 7,584,187 B2
(45) Date of Patent: Sep. 1, 2009

(54) SYSTEM, DETECTING METHOD AND PROGRAM

(75) Inventor: Issei Yoshida, Segataya-ki (JP)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 11/481,208

(22) Filed: Jul. 5, 2006

(65) Prior Publication Data
US 2007/0011162 A1    Jan. 11, 2007

(30) Foreign Application Priority Data
Jul. 8, 2005    (JP)    ............... 2005-200293

(51) Int. Cl.
    *G06F 17/30*    (2006.01)
(52) U.S. Cl. ................ 707/6; 705/10; 705/27
(58) Field of Classification Search ....... 707/6
    See application file for complete search history.

(56) References Cited

U.S. PATENT DOCUMENTS

| | | | | |
|---|---|---|---|---|
| 5,813,003 | A * | 9/1998 | Chen et al. ............... | 707/6 |
| 6,389,416 | B1 * | 5/2002 | Agarwal et al. ........... | 707/6 |
| 7,433,879 | B1 * | 10/2008 | Sharma et al. ............ | 707/101 |
| 2003/0078686 | A1 * | 4/2003 | Ma et al. ................. | 700/91 |
| 2003/0208488 | A1 * | 11/2003 | Perrizo ................... | 707/6 |
| 2003/0217055 | A1 * | 11/2003 | Lee et al. ................ | 707/6 |
| 2005/0027710 | A1 * | 2/2005 | Ma et al. ................. | 707/100 |
| 2006/0015504 | A1 * | 1/2006 | Yu et al. ................. | 707/10 |
| 2006/0248033 | A1 * | 11/2006 | Ramsey et al. ............ | 707/1 |

FOREIGN PATENT DOCUMENTS

JP    2003076937    3/2003

OTHER PUBLICATIONS

Brijs, Tom, A data mining framework for optimal product selection in retail supermarket data: The generalized PROFSET model, Circa 2000.*
R. Agrawal et al., Fast Algorithms for Mining Association Rules. Proceedings of the $21^{st}$ International Conference on Very Large Databases. Santiago Chile. Sep. 1994.

(Continued)

*Primary Examiner*—Mark Fadok
(74) *Attorney, Agent, or Firm*—Shimokaji & Associates, P.C.; Richard Goldman (57) ABSTRACT

Obtaining a closed pattern in a second itemspace which is made by adding a new item to a first itemspace based on a closed pattern obtained for the first itemspace. To provide a system for detecting a closed pattern, which is a maximum set of items, based on history information which records a set of items that is a target of transaction processing for each transaction. The system records at least a first closed pattern obtained for a first itemspace. The system generates an additional pattern by adding an additional item that is not included in the first itemspace and compares a set of transactions including the whole of the additional pattern with a set of transactions including any of the whole of the first recorded closed pattern. The system detects union of the first closed pattern and the additional pattern as a second closed pattern in the second itemspace, on condition that the compared sets are identical with each other.

1 Claim, 11 Drawing Sheets

OTHER PUBLICATIONS

N. Pasquier et al., Discovering Frequent Closed Itemsets for Association Rules. 7$^{th}$ International Conference on Database Theory, Jan. 1993.

Hiroki Arimura, et al., Efficient algorithm for discovering typical frequent epithode from large-scale-series data, materials of The 57$^{th}$ Foundation of Artificial Intelligence (SIG-FAI-A402), The Japanese Society for Artificial Intelligence, Nov. 4, 2004, p. 33-40.

Takeaki Uno, et al., "LCM: An Efficient Algorithm for Enumerating Frequent Closed Item Sets," materials of The 54$^{th}$ Foundation of Artificial Intelligence (SIG-FAI-A302), The Japanese Society for Artificial Intelligence, Mar. 3, 2004, p. 23-29.

Hiroki Arimura, et al., "An Efficient Algorithm for Discovering Frequent Closed Sequences," materials of The 57th Foundation of Artificial Intelligence (SIG-FAI-A402), The Japanese Society for Artificial Intelligence, Nov. 4, 2004, p. 33-40.

Hiroaki Arimura, et al., "An Efficient Algorithm for Mining Frequent Closed Sequential Episodes," Research Report of Information Processing Society of Japan, Information Processing Society of Japan, Oct. 15, 2004, vol. 2004 No. 101, p. 75-82.

Takeaki Uno, et al., "Fast Enumeration of Frequent Patterns," Technical Research Report of the Institute of Electronics, Information and Communication Engineers, The Institute of Electronics, Information and Communication Engineers, Dec. 3, 2004, vol. 104, No. 501, p. 17-19.

* cited by examiner

| TRANSACTION | SET OF ITEMS |
|---|---|
| $t_1$ | A  B  C  E |
| $t_2$ | A     C |
| $t_3$ |    B     E |
| $t_4$ |    B  C  E |

(b)

| ITEM | SET OF TRANSACTIONS |
|---|---|
| A | $t_1$  $t_2$ |
| B | $t_1$        $t_3$  $t_4$ |
| C | $t_1$  $t_2$        $t_4$ |
| E | $t_1$        $t_3$  $t_4$ |

```
1:   D = (T,I,R): A transactional database
2:   Algorithm EMIPRO(D,minsup)
3:   S = {φ}, k = 1
4:   while k ≤ n do:
5:     S = NEXT(D,k,minsup,S)
6:     k = k+1
7:   done
8:   return S
9:   Algorithm NEXT(D,k,minsup,S):
10:  $\bar{\bar{S}} = S$
11:  for each I ∈ S do
12:    $\tilde{I} = I \cup \{x_k\}$  // $x_k \in I$
13:    if (#$t_k(\tilde{I})$ ≥ minsup) then
14:      if (∃ J ∈ $\bar{\bar{S}}$ a.t. $t_k(J) = t_k(\tilde{I})$) then
15:        $\bar{\bar{S}} = (\bar{\bar{S}} \setminus \{J\}) \cup \{J \cup \tilde{I}\}$  // (a)
16:      else
17:        $\bar{\bar{S}} = \bar{\bar{S}} \cup \{\tilde{I}\}$  // (b)
18:  done
19:  return $\bar{\bar{S}}$
```

[Figure 9]

```
1:   Algorithm NEXT2(D,k,minsup,S_L):
2:   j = 1
3:   while j ≤ Size(S_L) do
4:      I = I_j
5:      if (x_k ∈ I) then
6:         break // no need to scan anymore
7:      Ĩ = I ∪ {x_k}
8:      if (#t_k(Ĩ) ≥ minsup) then
9:         if (∃ I_u ∈ S_L s.t. t_k(I_u) = t_k(Ĩ)) then
10:           Remove(S_L,u)
11:           Append(S_L, I_u ∪ Ĩ)  //(a)
12:           if (j < u) then
13:              j = j+1
14:        else
15:           Append(S_L, {Ĩ})  //(b)
16:           j = j+1
17:     else
18:        // (c) skip unnecessary scans,
19:        // checking frequency of I.
20:        I_prev = I
21:        do
22:           j = j+1
23:           I = I_j
24:        while( j ≤ Size(S_L) ∧ I_prev ⊆ I )
25:  done
26:  return S_L
```

SYSTEM, DETECTING METHOD AND PROGRAM

BACKGROUND OF THE INVENTION

1. Field of the Invention

The present invention relates to a system, a detecting method and a program. Specifically, the present invention relates to a system for analyzing history information of a transaction, a detecting method and a program.

2. Background Art

A data mining for extracting useful information from large quantity of stored data has been studied. With the data mining, a correlation rule of "Consumers buy beer and paper diapers together on Thursday", for example, based on data of receipts issued from retailers. Accordingly, it is expected for a company to appropriately set its inventory control strategy or its marketing strategy with the data mining without depending on experience or intuition of its manager or its person in charge.

A technique for detecting a set of items (for example, goods) frequently appearing in target data is called frequent pattern mining, which has been studied from various aspects (see R. Agrawal, R. Srikant: Fast Algorithms for Mining Association Rules, Proc. of the 20th Int'l Conference on Very Large Databases, Santiago, Chile, September 1994. Expanded version available as IBM Research Report RJ9839, June 1994). It is also known that it is enough to obtain only a pattern to meet the maximum condition, which is described by using frequency of appearance and an inclusive relation of sets, in order to list all the frequency patterns (see N. Pasquier, Y. Bastide, R. Taouil, and L. Lakhal: Discovering frequent closed itemsets for association rules, In 7th Intl. Conf on Database Theory, January 1999). That pattern is called a closed pattern.

It is also known that a frequency pattern can be obtained if only a frequently appeared closed pattern can be obtained and the subsets of the closed pattern are listed (see N. Pasquier, Y. Bastide, R. Taouil, and L. Lakhal: Discovering frequent closed itemsets for association rules, In 7th Intl. Conf on Database Theory, January 1999, above). Accordingly, various methods for efficiently obtaining a closed pattern have been studied (for example, see T. Uno, T. Asai, Y. Uchida, H. Arimura: LCM: An Efficient Algorithm for Enumerating Frequent Closed Sets of Items, Proceedings of the ICDM 2003 Workshop on Frequent Itemset Mining Implementations, 2003).

A problem to be solved by the invention will be described by an example in which each sales processing in a certain sales system is considered as a transaction and goods sold together by the sales processing is considered as an item. In this example, database records histories of numeral transactions as sets of items sold in each transaction. A group of goods frequently sold in the sales system can be obtained by obtaining a closed pattern from the database.

In order to effectively use the data mining for a sales strategy, it may not be enough to simply obtain a frequency pattern for all the goods. It may be desired to obtain a frequency pattern only for particular goods which do not sell well for the purpose of investigating the cause of the poor sale. It may also be desired to obtain a frequency pattern only for a group of goods displayed on the same show case for the purpose of reviewing arrangement of goods at a retailer. In such cases, a closed pattern only needs to be detected for an itemspace formed by sets of the particular items.

Displaying ways, sales or the other status of goods depend on passage of time, the place of the shop or the like. Therefore, if a closed pattern is detected for a first itemspace, another closed pattern may need to be obtained for a second itemspace which is the first itemspace added with a new item. In such a case, information on a closed pattern obtained for the first itemspace has been abandoned and a closed pattern for the second itemspace has been newly obtained. For such a reason, a long time is required for detecting a closed pattern even for a small change of the itemspace.

The present invention intends to provide a system for solving the problem mentioned above, a detecting method and a program. The intention is achieved by a combination of features described in independent claims of the claims. Dependent claims thereto define further advantageous specific examples of the present invention.

SUMMARY OF THE INVENTION

In order to solve the problem mentioned above, a first embodiment of the present invention is a system for detecting a closed pattern, which is a maximum set of items common to a set of transactions, based on history information which records a set of items including targets of transaction processing as items for each transaction, comprising: a recording unit for recording at least a first closed pattern obtained for a first itemspace consisting of a predetermined set of items; a generating unit for generating an additional pattern by adding an additional item that is an item not included in the first itemspace to any of the first recorded closed patterns; a comparing unit for comparing a set of transactions including the whole of the additional pattern in the set of items with a set of transactions including any of the whole of the first recorded closed pattern in the set of items; and a detecting unit for detecting union of the first closed pattern and the additional pattern as a second closed pattern that is a closed pattern in the second itemspace that is made by adding the additional item to the first itemspace, on condition that the sets compared by the comparing unit are identical with each other, a detecting method for detecting a closed pattern by the system and a program for causing an information processing unit to function as the system.

The outline of the present invention does not cover all the necessary features of the present invention and sub combinations of the features may also be the invention.

According to the present invention, a closed pattern can be obtained in a second itemspace that is made by adding a new item to a first itemspace, based on a closed pattern obtained in the first itemspace.

DETAILED DESCRIPTION

Although the present invention will be described by embodiments of the invention, the embodiments below do not limit the invention according to the claims, and all the combinations of features described in the embodiments are not necessary for means for solving the problems of the invention.

Figure 1:
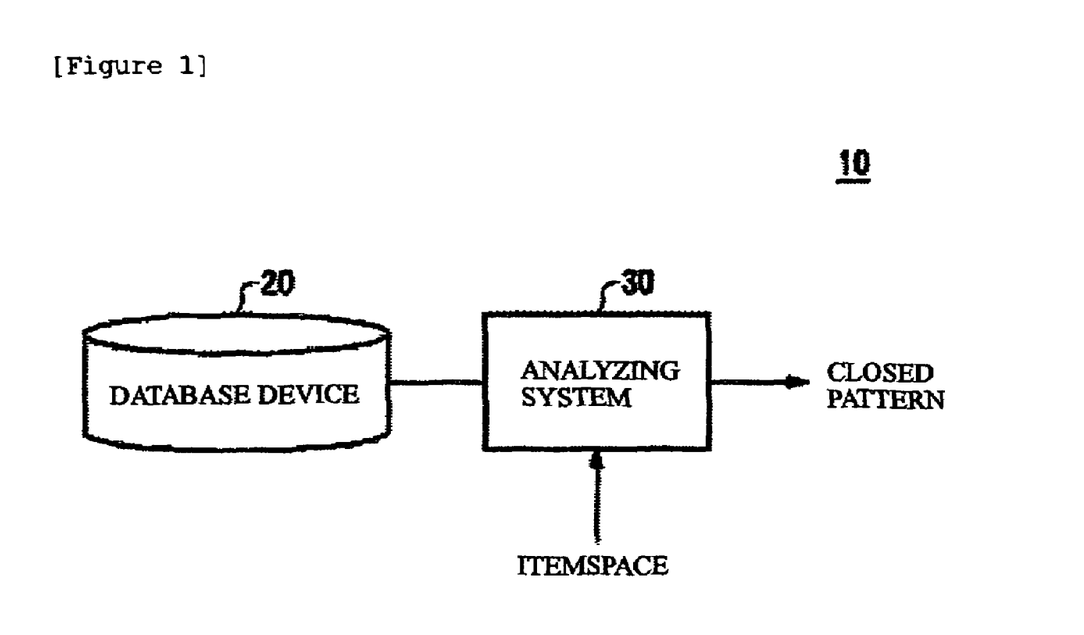
FIG. 1 shows the entire arrangement of an information system 10.

FIG. 1 shows the entire arrangement of an information system 10. The information system 10 has a database device 20 and an analyzing system 30. The database device 20 processes a transaction such as selling of goods required by a user and records history information recording transactions histories. Specifically, the database device 20 records history information recording sets of items including targets of transaction processing as items for each transaction. The database device 20 records the sets of items of the transactions by adding the sets of items of the transactions to the sets of items that has been recorded in the history information each time it processes a transaction.

The analyzing system 30 detects a closed pattern that is the maximum set of items common to sets of transactions, based on history information. Specifically, the analyzing system 30 lets a user input an indication of an itemspace that is a set of items, from which a closed pattern is detected. Then, the analyzing system 30 detects and outputs a closed pattern in the indicated itemspace in the sets of items in the history information.

The information system 10 in this embodiment obtains a closed pattern in a second itemspace, which is made by adding a new item to a first itemspace, based on the closed pattern obtained for the first itemspace. Herewith, the present invention intends to detect a closed pattern with processing more efficiently than conventional system even when a range for detection is enlarged.

Figure 2:
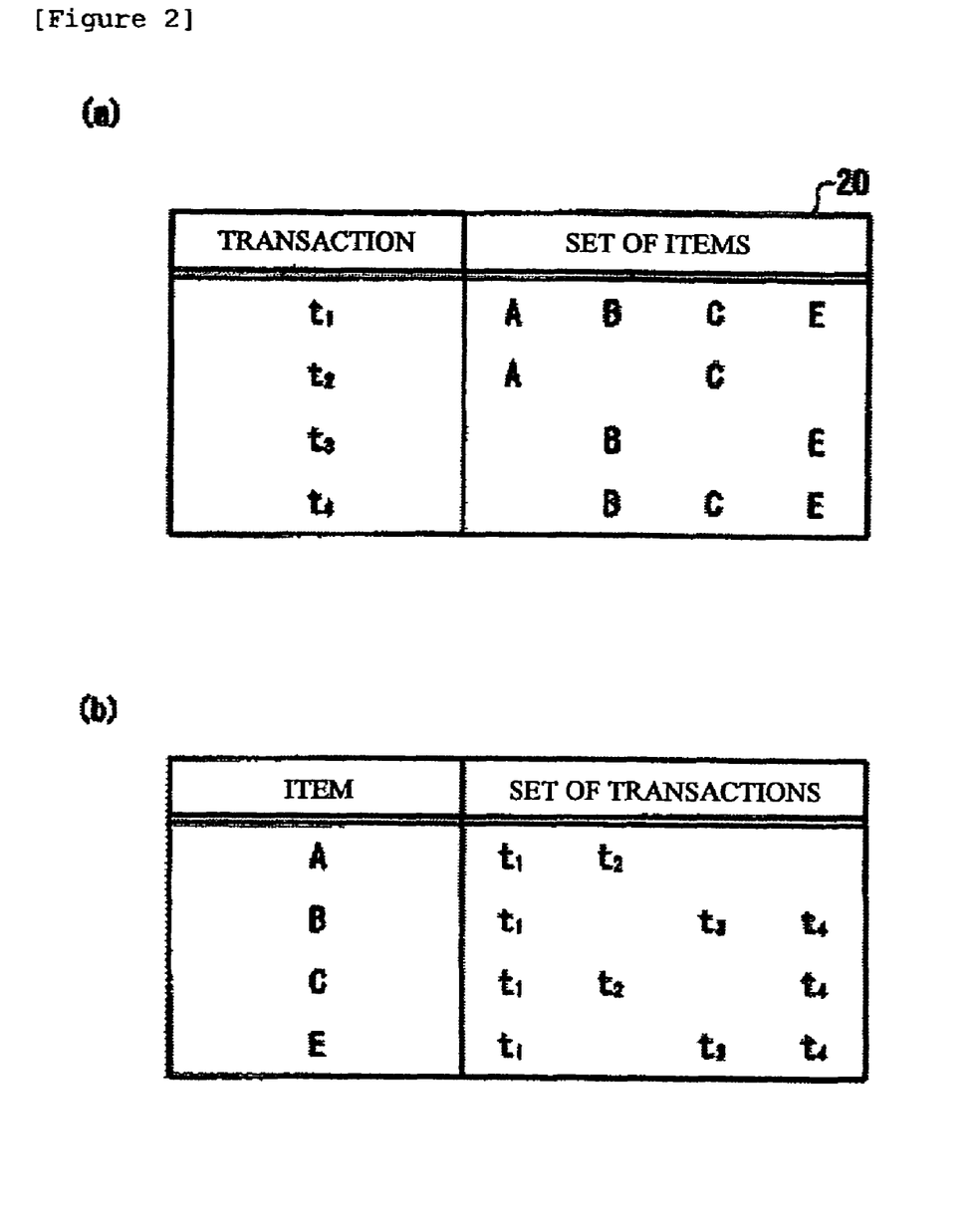
FIG. 2 shows an outline of a data structure of the database device 20.

FIG. 2 shows an outline of a data structure of the database device 20. As shown in (a), the database device 20 records history information recording a set of items including targets of transaction processing as items for each transaction. Here, the term "transaction" means a series of processing to be performed according to a request received from the same user in an information processing unit such as the database device 20. As an example, a transaction is processing for selling a plurality of goods bundled and doing a lump-sum payment in a goods selling web site.

The term "item" means a target of transaction processing that also may be an attribute of which issued a request for a transaction or an attribute indicating the contents of transaction processing. As an example, an item is goods that sold at a goods selling web site. As another specific example, an item may be sexes or age groups of purchaser of the goods or may be processing types such as purchasing processing or canceling processing of a purchase.

In the example of the figure, the database device 20 records a history of four transactions from $t_1$ to $t_4$ as history information. The database device 20 records items A, B, C and E, the targets of the transaction $t_1$, in association with the transaction $t_1$. According to the example, it is apparent that the items A, B, C and E were sold by the transaction $t_1$.

The term "itemspace" means a predetermined set of items. The term "closed pattern" in an itemspace means a set of items that fulfills characteristics of a closed pattern when the set of items indicated by the itemspace is focused on. For example, in the figure, when a closed pattern is detected for the itemspace {A, B, C}, history information except for the item E is the target of a closed pattern detection.

Figure (b) shows a detecting table for obtaining a set of transactions including items as index. The detecting table is constructed by a constructing unit 330 to be described later based on history information shown in (a). The detecting table is for making processing for obtaining a set of transactions from history information more efficient and shows the same contents as the history information shown in (a).

Figure 3:
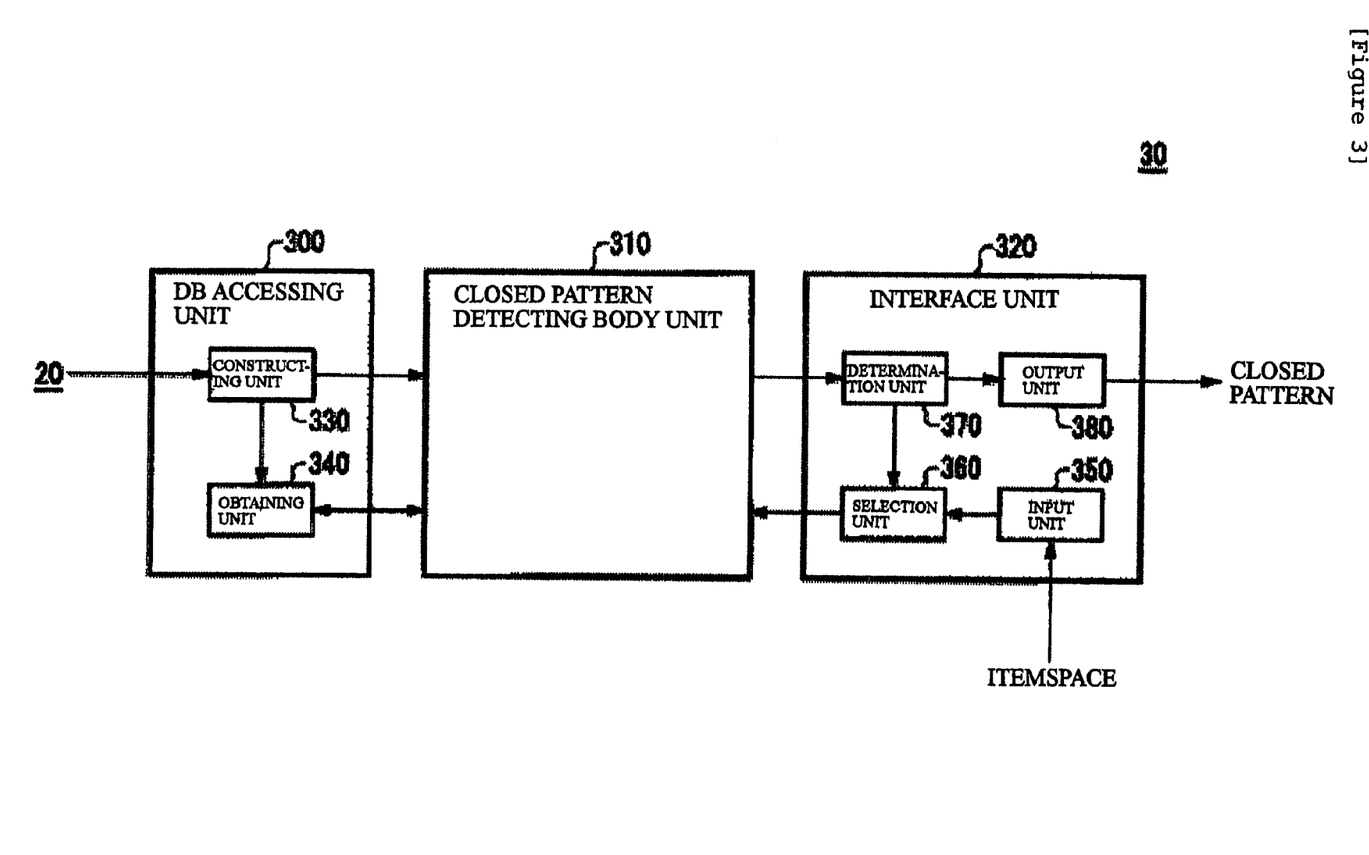
FIG. 3 shows a functional arrangement of the analyzing system 30.

FIG. 3 shows a functional arrangement of the analyzing system 30. The analyzing system 30 has a DB accessing unit 300, a closed pattern detecting body unit 310 and an interface unit 320. The DB accessing unit 300 has a constructing unit 330 and an obtaining unit 340. The DB accessing unit 300 accesses the database device 20 and supplies the access result to the closed pattern detecting body unit 310. The closed pattern detecting body unit 310 obtains a second closed pattern in the second itemspace based on a first closed pattern that has been obtained for the first itemspace, and outputs the second closed pattern to the interface unit 320. The interface unit 320 detects a set of closed patterns in the user indicated itemspace by using the closed pattern detecting body unit 310 and outputs the detection result.

The DB accessing unit 300 has the constructing unit 330 and an obtaining unit 340. As mentioned above, the constructing unit 330 constructs a detecting table based on history information. The constructing unit 330 outputs history information or a detecting table to the closed pattern detecting body unit 310 as required from the closed pattern detecting body unit 310. The obtaining unit 340 obtains the number of transactions including indicated patterns as a set of items according to the indication of the closed pattern detecting body unit 310 from history information.

The interface unit 320 has an input unit 350, a selection unit 360, a determination unit 370 and an output unit 380. The input unit 350 inputs indication of a target itemspace, which is a target itemspace of detection of a closed pattern. The selection unit 360 selects items which are not included in the first itemspace of the target itemspace as additional items one by one. Accordingly, the closed pattern detecting body unit 310 detects a second closed pattern in the second itemspace which is made by adding the additional items to the first itemspace. The determination unit 370 determines whether the second itemspace is identical with the target itemspace or not when the closed pattern detecting body unit 310 detects the second closed pattern.

The selection unit 360 selects the next additional item on condition that the itemspaces are not identical. Then, an additional item to be added to a first closed pattern is selected with the second closed pattern that has been detected and recorded in a recording unit 400 in the closed pattern detecting body unit 310 being the next first closed pattern. On the other hand, the output unit 380 outputs a detected second closed pattern as a set of items that frequently appears in history information on condition that the second itemspace is identical with the target itemspace. For example, the output unit 380 may output a set of selling objects shown by the second closed pattern as a set of selling objects which are likely to be purchased together by consumers.

Figure 4:
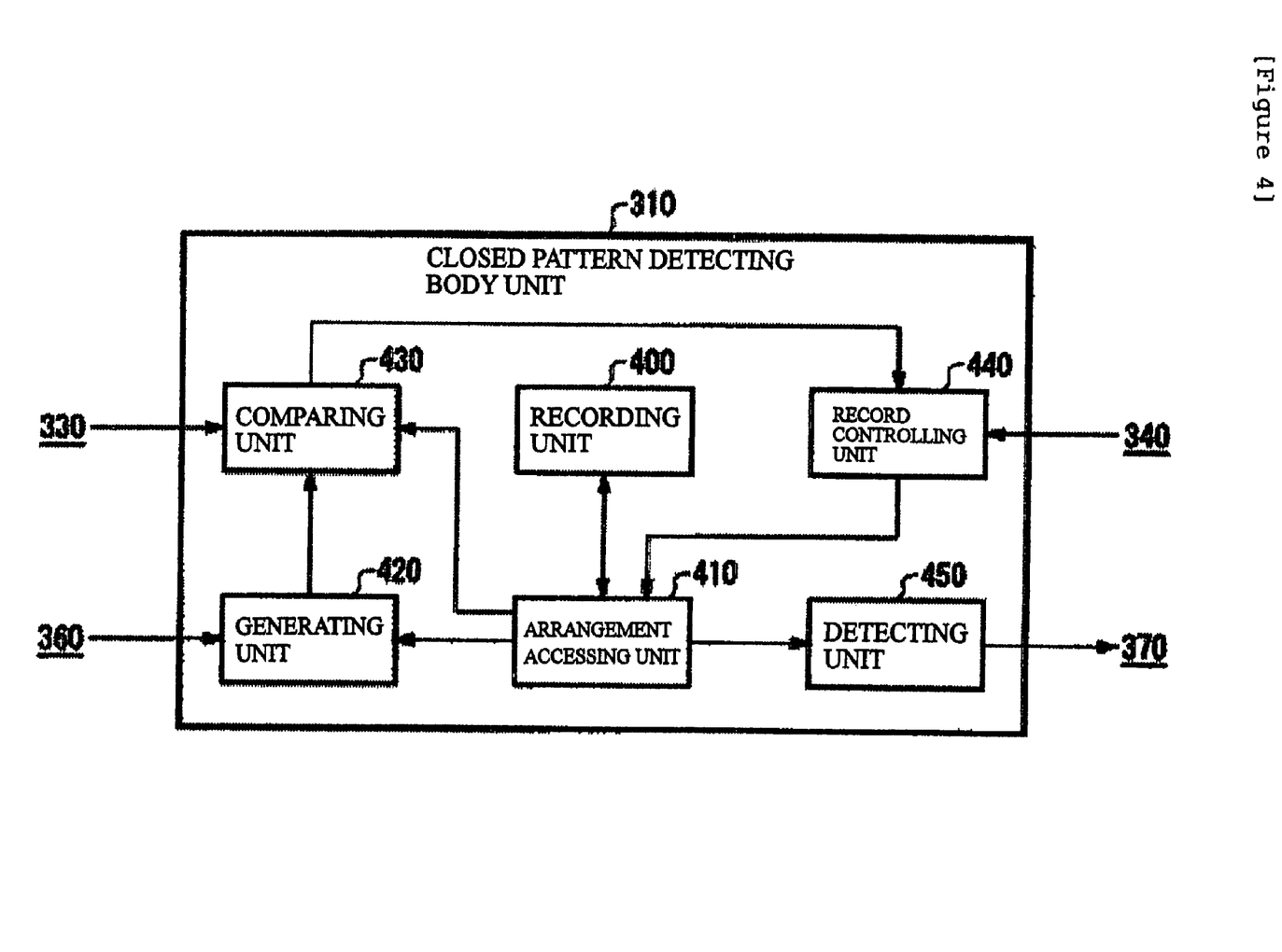
FIG. 4 shows a functional arrangement of the closed pattern detecting body unit 310.

FIG. 4 shows a functional arrangement of the closed pattern detecting body unit 310. The closed pattern detecting body unit 310 has the recording unit 400, an arrangement accessing unit 410, a generating unit 420, a comparing unit 430, a record controlling unit 440 and a detecting unit 450. The recording unit 400 records at least a first closed pattern obtained for the first itemspace consisting of predetermined sets of items. For example, the recording unit 400 may record the first closed pattern obtained for the first itemspace consisting of a predetermined set of selling objects. As a specific structure, the recording unit 400 may record arrangement variables in which each of the first closed patterns being an element. The first closed pattern is a candidate for the second closed pattern which is a candidate of a closed pattern in the second itemspace.

The arrangement accessing unit 410 reads out the elements of the arrangement variables one by one from the top. The arrangement accessing unit 410 reads out any element of the arrangement variables and outputs it to the comparing unit 430 in response to a request of the comparing unit 430. The generating unit 420 generates an additional pattern by adding an additional item selected by the selection unit 360 to any of the first closed patterns recorded in the recording unit 400. When the whole of the second closed patterns are obtained, the generating unit 420 generates each of a plurality of additional patterns by adding additional items one by one to each of all the first closed patterns recorded in the recording unit 400.

The comparing unit 430 obtains a set of transactions including the whole of the additional patterns in a set of items. Specifically, the comparing unit 430 obtains the set by searching history information in the database device 20 for transactions including any items included in additional patterns. More specifically, the comparing unit 430 may search a detecting table by using each item included in an additional pattern as an index by using a detecting table shown in FIG. 2 (*b*) and obtain a set of transactions corresponding to any item. For example, if the additional pattern is {A, C}, a transaction $t_1$ and a transaction $t_2$ that include the whole of {A, C} are obtained.

Then, the comparing unit 430 obtains a set of transactions including any of the whole of the first closed patterns recorded in the recording unit 400 in a set of items. Similarly to the case of the additional pattern, the comparing unit 430 may search a detecting table by using each item included in the first closed pattern as an index and obtain a set of transactions corresponding to any item.

In order to appropriately obtain the whole of the second closed patterns, the comparing unit 430 obtains a set of transactions including the whole of the second closed pattern candidates in a set of items for each of the whole of the second closed pattern candidates recorded in the recording unit 400. Then, the comparing unit 430 compares each of the obtained sets with a set obtained for an additional pattern.

The record controlling unit 440 causes the obtaining unit 340 to obtain the number of additional patterns and determines whether the number is a predetermined reference or more or not. Only if the number is the reference or more, the record controlling unit 440 determines whether a set of transactions for additional patterns is identical with a set of transactions for any second closed pattern candidate. On condition that the transactions sets are identical, the record controlling unit 440 adds union of the second closed pattern candidates and the additional patterns, instead of the second closed pattern candidate, to the recording unit 400 as a new second closed pattern candidate and records it. If the number is the reference or more but the sets of transactions are not identical, the record controlling unit 440 adds the additional pattern to the recording unit 400 as the second closed pattern candidate and records it. The record processing is performed via the arrangement accessing unit 410. For example, the arrangement accessing unit 410 may record the second closed pattern to be added as the next element of the last element of the arrangement variables.

The detecting unit 450 detects each of the second closed pattern candidates recorded in the recording unit 400 as the second closed pattern in response to the completion of processing for the whole of the additional pattern and sends the detection result to the determination unit 370.

Figure 5:
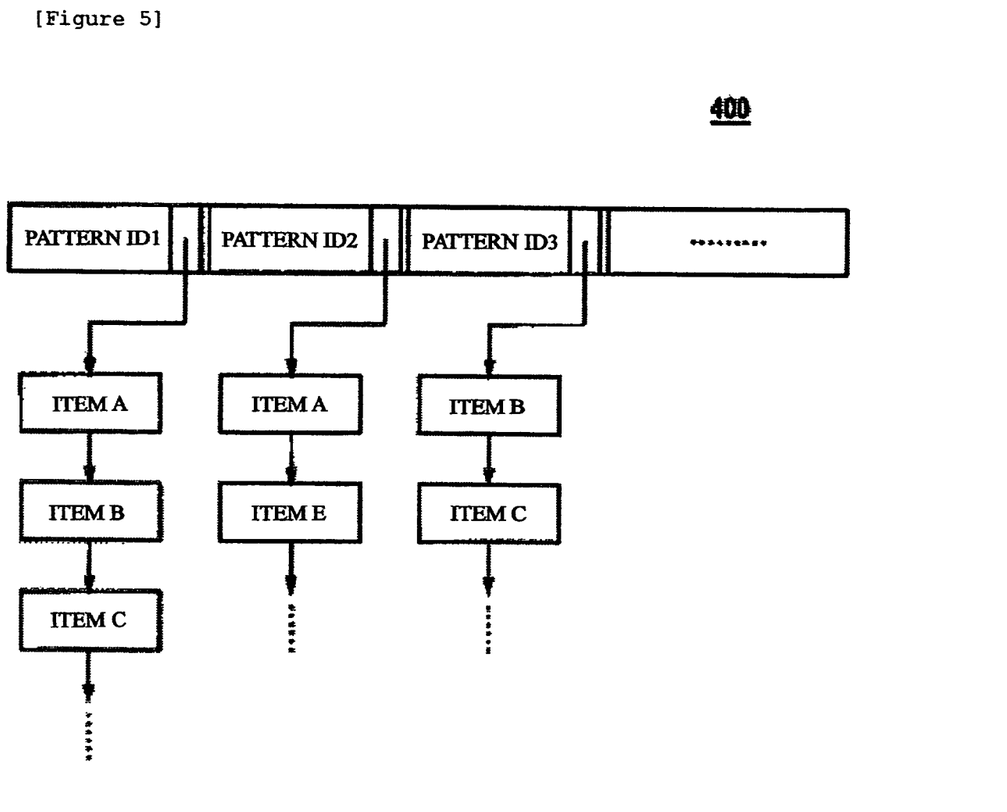
FIG. 5 shows an example of a data structure of the recording unit 400.

FIG. 5 shows an example of a data structure of the recording unit 400. The recording unit 400 records the arrangement variables which makes each of the second pattern candidates an element. As the closed patterns are a set of items, each of the closed patterns is associated with at least one item. In this figure, each element of the arrangement variables only has identifying information that identifies the second closed pattern candidate and a pointer to an item. The sets of items included in the pattern are managed by a list structure which connects respective items. For example, a pattern with identifying information being 1 includes an item A, an item B and item C as a set of items.

Instead of the arrangement variables, the recording unit 400 may record the pattern in another data structure, which can select the next second closed pattern one by one by selecting each of the second closed pattern candidates. For example, the recording unit 400 may record a second closed pattern candidate by using a list structure which can be scanned in one direction or may record a second closed pattern candidate by using a list structure which can be operated in two directions.

In the case where no closed pattern is detected or the like, the recording unit 400 records information indicating a null set which includes no closed pattern. In this case, the closed pattern detecting body unit 310 can detect a closed pattern in any itemspace by applying a function of FIG. 3 similar to the null set.

Figure 6:
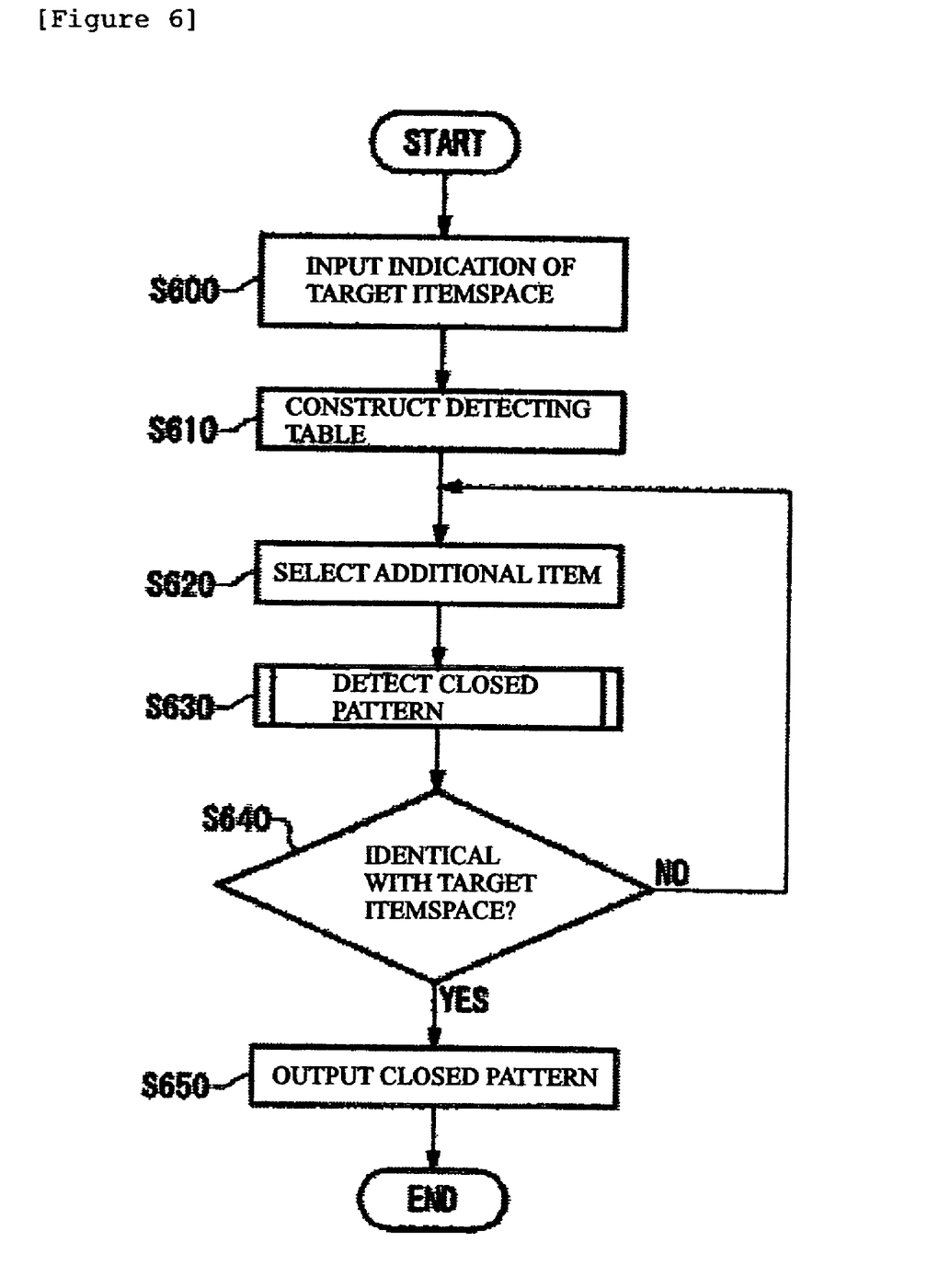
FIG. 6 shows an example of processing for the database device 20 to detect a closed pattern of objective itemspace.

FIG. 6 shows an example of processing for the database device 20 to detect a closed pattern of target itemspace. The input unit 350 inputs an indication of the target itemspace (S600). The construction unit 330 constructs a detecting table (S610). The selection unit 360 selects an additional item (S620). The closed pattern detecting body unit 310 detects a closed pattern in the second itemspace that is made by adding the additional item to the first itemspace (S630). If the second itemspace is not identical with the target itemspace (S640), the analyzing system 30 returns processing to S620.

If the second itemspace is identical with the target itemspace (S640: YES), the output unit 380 outputs each of the detected second closed pattern as sets of items that frequently appear in history information (S650).

Figure 7:
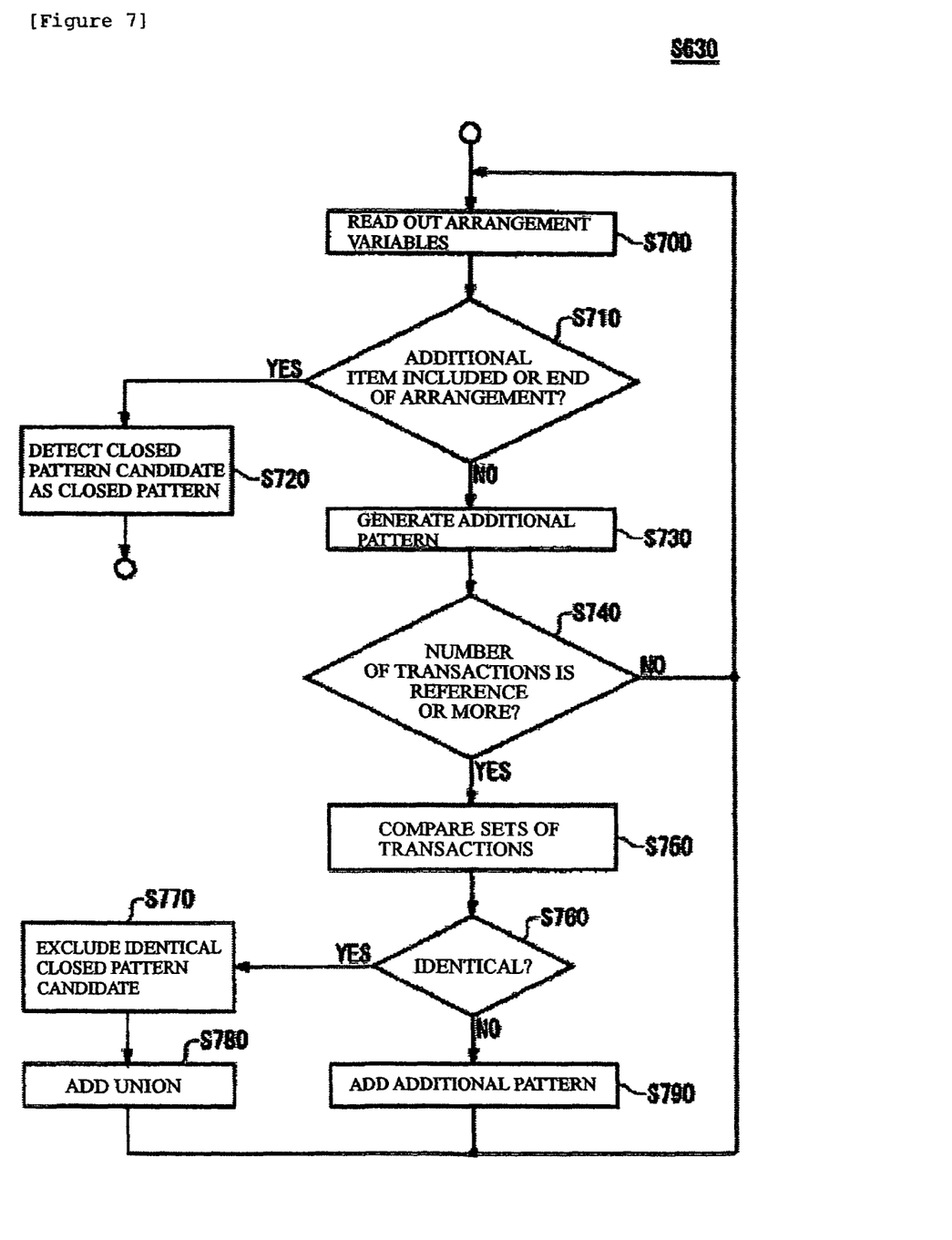
FIG. 7 shows an example of processing in S630 of FIG. 6.

FIG. 7 shows an example of processing in S630 of FIG. 6. That processing varies depending on the recording order of the first closed patterns to be recorded by the recording unit 400. In this figure, the recording unit 400 is assumed to arrange each of the first closed patterns in the order of combination trees of items included in the pattern scanned in a predetermined scanning order. More specifically, FIG. 10 (*a*) shows an example of tree structured data indicating a combination of items. In this tree structure, a set of items that is made by adding another item to a set of items shown by parent nodes (upper direction in the figure) is arranged as children nodes of the parent nodes. That is to say, for example, a set of items consisting of a node C and a node B including the node C are arranged to children nodes of the parent node showing a node C. The recording unit 400 arranges and records each of the first closed patterns according to the scanning order for scanning the tree structure by right depth-first search.

Return to FIG. 7. The arrangement accessing unit 410 reads out elements of arrangement variables one by one from the top (S700). The detecting unit 450 determines whether an element read out by the arrangement accessing unit 410 includes an additional item or reaches the end of the arrangement variables and no element is read out (S710). Each element of the arrangement variables is arranged in the scanning order that a tree structure indicating a combination of sets of items is scanned by right depth-first search. When elements including an additional item are read out, any following element includes the additional item. Therefore, when the arrangement variables are read out from the top and an additional item is first read out, reading out of the following elements can be omitted.

On condition that an additional item is included, or that the last element of the arrangement variables is reached (S710: YES), the detecting unit 450 detects the second closed pattern candidate currently recorded in the recording unit 400 as a second closed pattern (S720). On condition that the read out element does not include an additional item (S710: NO), the generating unit 420 generates an additional pattern by adding an additional item to the first closed pattern shown by the read out element (S730). The storage controlling unit 440 determines whether the number of transactions including the whole of the additional patterns as a set of items is a reference or more (S740). If the number is less than the reference (S740: NO), the closed pattern detection body unit 310 returns processing to S700.

Preferably, the arrangement accessing unit 410 omits a part of processing by comparing the already read out element with the element to be read out next. Specifically, on condition that a set of items shown by the read out element is a set of items shown by any of the already read out elements and the number of obtained transactions including a set of items is the reference or less, the arrangement accessing unit 410 reads out the next element without letting the generating unit 420 process the read out element. That makes processing more efficient by omitting redundant processing. More specifically, the processing is realized by orders from the line 20 to the line 24 in the program example of FIG. 9.

If the number is the reference or more (S740: YES), the comparing unit 430 compares a set of transactions including the whole of the added patterns with a set of transactions including the whole of the second closed pattern candidates obtained for each of the second closed pattern candidates as a set of items (S750). On condition that the set of transactions is identical with a set of transactions for any of the second closed pattern candidate, the record controlling unit 440 excludes an element indicating the identical second closed pattern candidate from the arrangement variables (S770). The term "transaction set" means a set of transactions based on information only focused on the second itemspace of history information. That is to say, if the second itemspace is {A, C}, the transaction {A, C, E} is determined as the same as the transaction {A, C, D}.

Each following element of the elements in the arrangement variables is moved toward the top one by one and arranged there. Then, the record controlling unit 440 adds an element indicating union of the additional pattern and the second closed pattern candidate to next to the last element of the arrangement variables (S780). On condition that it does not match a set of transactions for any second closed pattern candidate (S760: NO), the record controlling unit 440 adds an element indicating the additional pattern to next to the last element of the arrangement variables (S790). Herewith, the arrangement variables after elements are added can also arrange the second closed pattern candidate in a scanning order of scanning a tree structure showing a combination of sets of items by right depth-first searching.

Figure 8:
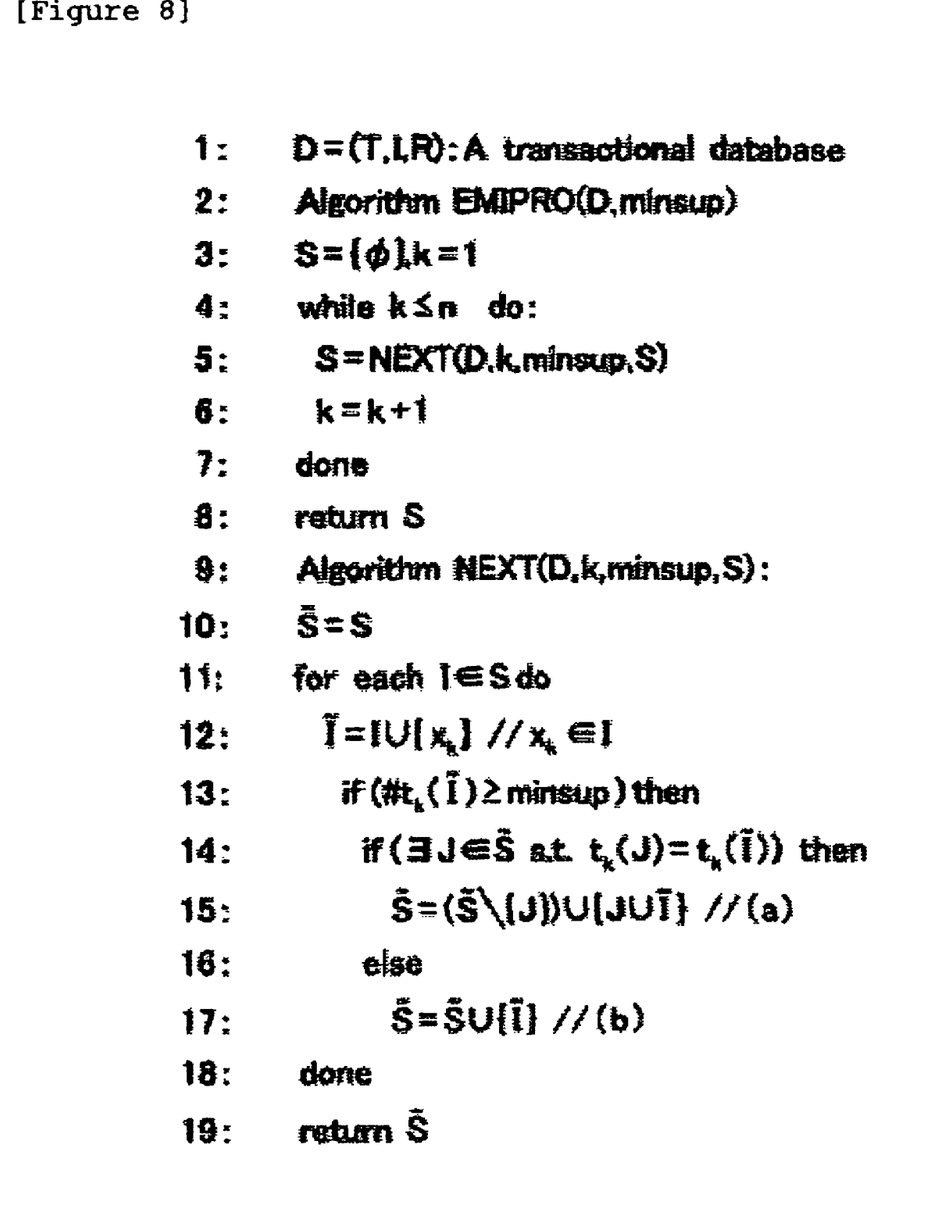
FIG. 8 shows an example of a program realizing processing of this embodiment (the first example).

FIG. 8 shows an example of a program realizing processing of this embodiment (the first example). The variable S records the second closed pattern candidate in the program example. The variable n indicates the number of items in the target itemspace. The variable I indicates the first closed pattern. $x_k$ indicates an additional item and I- indicate additional patterns. "minsup" indicates a predetermined reference value for the number of transactions.

A program from the line 1 to the line 8 corresponds to the flowchart shown in FIG. 6. That is to say, an itemspace is enlarged one by one at the line 6, and a closed pattern is obtained one by one for the itemspace to be enlarged at the line 5. In response to function call at the line 5, processing proceeds from the line 9 to the line 19. In response to the order of the line 11, the generating unit 420 selects each of the first closed patterns one by one. In response to the order of the line 12, the generating unit 420 generates an additional pattern by adding an additional item to the selected first closed pattern. In response to the order of the line 13, whether the number of transactions including the whole of the additional patterns is reference or more or not is determined.

In response to the order of the line 14, the comparing unit 430 determines whether a set of transactions including the whole of the second closed pattern candidates obtained for any of the second closed pattern candidate is identical with a set of transactions including the whole of the additional patterns or not. In response to the order of the line 15, the record controlling unit 440 excludes the identical second closed pattern candidate from a set of the second closed pattern candidates and adds union of the second closed pattern candidates and the additional patterns as a new second closed pattern candidate. That is to say, on condition that the sets compared by the comparing unit 430 are identical with each other, the detecting unit 450 can detect union of the first closed patterns and said additional patterns as the second closed pattern in the second itemspace.

Figure 9:
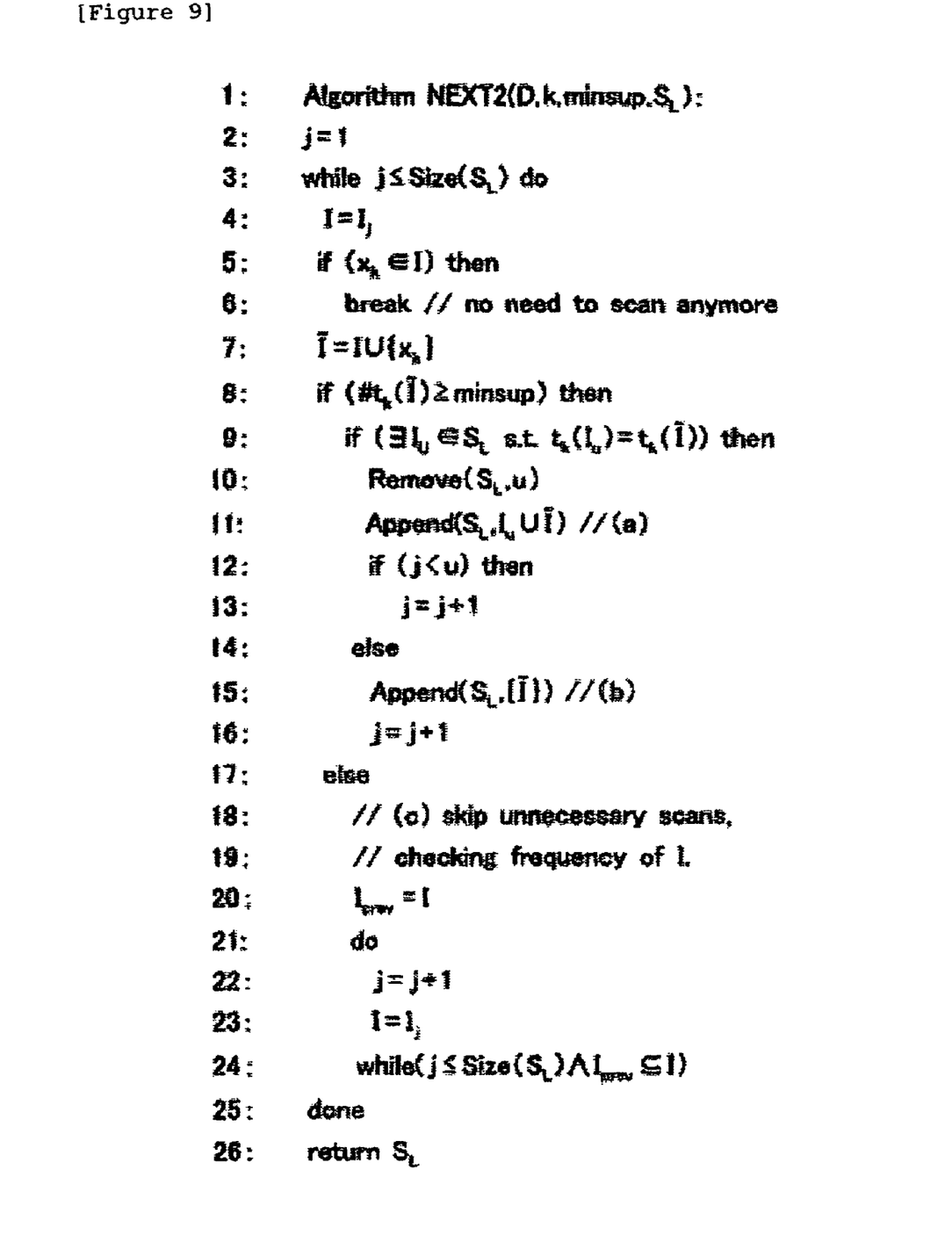
FIG. 9 shows an example of a program realizing processing of this embodiment (the second example).

FIG. 9 shows an example of a program realizing processing of this embodiment (the second example). The program of the figure shows processing where it replaces the part "Algorithm NEXT" shown in FIG. 8 and executed, and the recording unit 400 records the second closed pattern candidates as arrangement variables. In the figure, $S_L$ indicates the arrangement variable. In response to the order of the line 4 and the line 5, the detecting unit 450 determines whether the second closed pattern candidate includes an additional item or not. If it is read out, the processing of the figure ends according to the processing shown in the line 6.

In response to the line 7, the generating unit 420 generates an additional pattern. On condition that the number of transactions including the whole of the additional patterns is the reference or more (the line 8), the processing proceeds to the next line. In response to the order of the line 9, the comparing unit 430 determines whether a set of transactions including the whole of the second closed pattern candidates obtained for any of the second closed pattern candidates is identical with a set of transactions including the whole of the additional pattern.

In response to the order of the line 10, the identical second closed pattern candidate is excluded from the arrangement variables and each of following elements is moved toward the top by one element one by one and arranged there. In response to the order of the line 11, a new second closed pattern candidates consisting of union of the additional patterns and the second closed pattern candidates is added as the next element to the last element of the arrangement variables. In the line 12 and the line 13, subscripts of the arrangement variables are changed as required when the arrangement variables change.

In response to the order of the line 15, an element indicating an additional pattern is added next to the last element of the arrangement variables as a new second closed pattern candidate. From the line 18 to the line 24 show a group of orders for omitting the same processing when processing for the first closed pattern to be read out next is the same as processing for the first closed pattern that is already read out. That is to say, in response to the group of orders, the arrangement accessing unit 410 reads out the next element without causing the generating unit 420 to process the read out element, on condition that a set of items indicated by the read out element includes a set of items indicated by any element which has been already read out.

Figure 10:
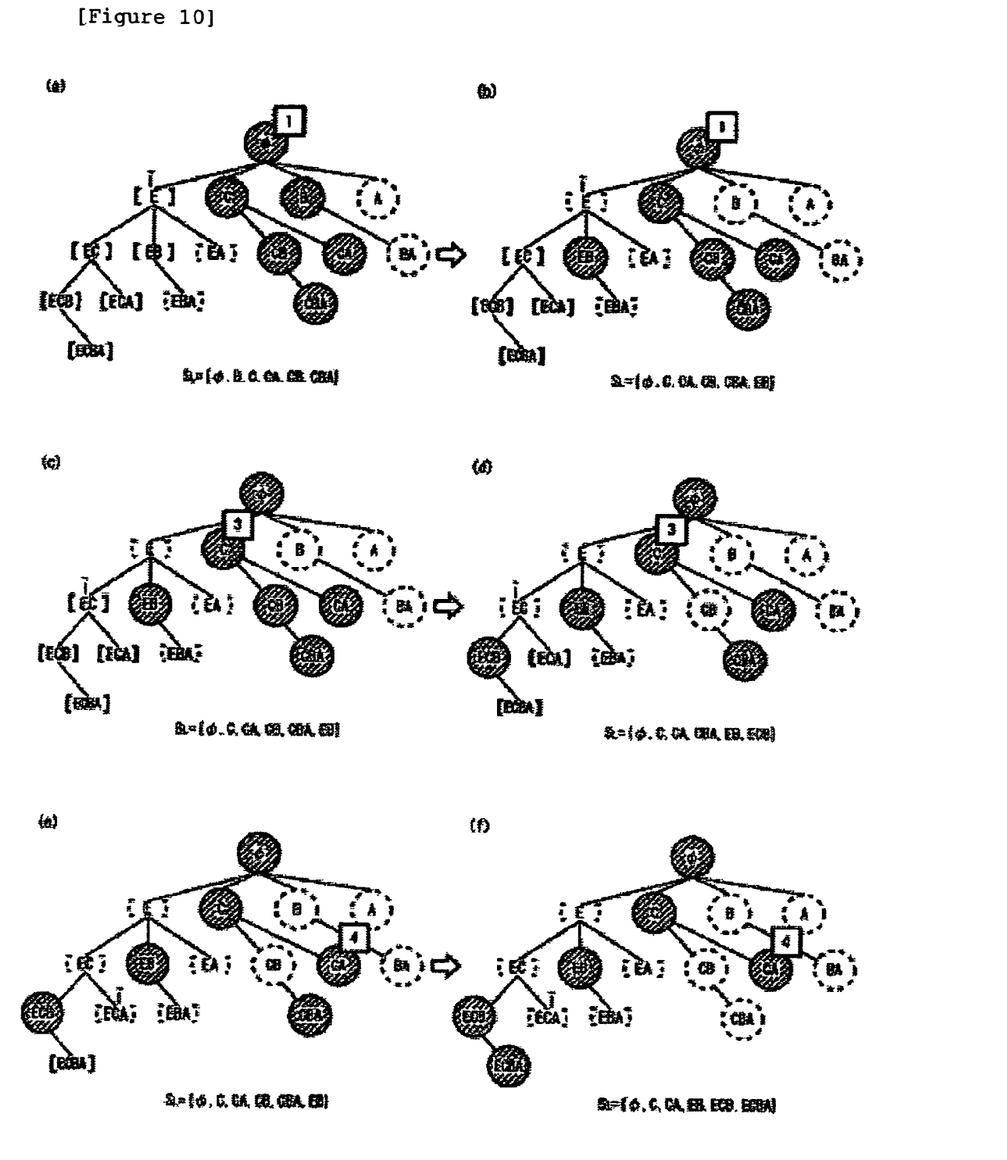
FIG. 10 shows process of processing of this embodiment.

FIG. 10 shows process of processing of this embodiment. The figure shows specific process of processing for obtaining a closed pattern based on history information shown in FIG. 2. (a) shows a set of closed patterns in the first itemspace consisting of A, B and C. That is to say, the closed patterns are B, C, CA, CB and CBA in the first itemspace. These closed patterns are represented as shaded nodes in the tree structure. By using this example, processing for obtaining a closed pattern for the second itemspace which is made by adding an element E to the first itemspace will be described.

The generating unit 420 generates an additional pattern EB by adding an element E, which is an additional item, to the first closed pattern consisting of an element B (hereinafter referred to as a pattern B or the like). The comparing unit 430 obtains a set of transactions including the whole of the patterns for each of the pattern B and the pattern EB. As shown in FIG. 2, sets of transactions including the pattern B are $t_1$, $t_3$ and $t_4$. Sets of transactions including any of the element B and the element E are also $t_1$, $t_3$ and $t_4$. Therefore, the comparing unit 430 excludes the pattern B and adds union of the pattern B and the pattern BE as a new second closed pattern candidate (b).

Next, the generating unit 420 generates an additional pattern EC by adding the element E, which is an additional item, to the first closed pattern consisting of an element C (c). Sets of transactions including the whole of the additional pattern EC is identical with sets of transactions including the whole of the pattern CB. Therefore, the comparing unit 430 excludes the pattern CB and adds the pattern ECB, which is union of the pattern CB and the pattern EC, as a new second closed pattern candidate (d).

Then, the comparing unit 430 generates an additional pattern ECA by adding the element E, which is an additional item, to the pattern CA (e). Sets of transactions including the whole of the additional patterns ECA is identical with sets of transactions including the whole of a pattern CBA. Therefore, the comparing unit 430 excludes the pattern CBA and adds a pattern ECBA, which is union of the pattern CBA and the pattern ECA, as a new second closed pattern candidate (f).

As mentioned above, according to the embodiments shown in FIGS. 1 to 10, a closed pattern in the second itemspace, which is made by adding another item to the first itemspace, can be obtained based on the closed pattern which has already been obtained for the first itemspace. Accordingly, such applications shown below are possible.

(1) Addition of item types to be detected

The recording unit 400 records a closed pattern for the first itemspace showing a set of selling objects. The generating unit 420 generates an additional pattern by adding an attribute of a purchaser to the first itemspace as an additional item. The second closed pattern obtained accordingly is outputted by the output unit 380 as a set of selling objects which are likely to be purchased together and attributes of purchasers who are likely to purchase the selling objects. As such, even if the target of analysis is enlarged from only the goods to attributes of the purchasers, processing can be made more efficient by effectively using the already obtained detection result of the closed pattern.

(2) Following to the change of detection object

A web server has a plurality of web pages. When the contents of the web page changes, a new web page may be added to existing web pages or a new web page may replace existing web pages. In such a case, conventionally, if a closed pattern is obtained for a browsing history of existing web pages, a closed pattern needs to be obtained for the whole of the web pages including the new web page.

By applying the analyzing system 30 of this example to the case above, closed patterns can be efficiently obtained for the whole of the web pages including a new web page. In such processing, specifically, history information records displayed web pages as items for each transaction processing for displaying at least one web page to a user. Then, the recording unit 400 records the first closed pattern by making a predetermined set of web pages as the first itemspace. The generating unit 420 generates an additional pattern by making a newly added web page an additional item. The detecting unit 450 detects union of the first closed pattern and the additional pattern as the second closed pattern in the second itemspace which indicates a set of web pages including the new web page.

This example can efficiently detect a closed pattern for an itemspace, to which a new item is added, by effectively using the already obtained detection result of the closed pattern.

Figure 11:
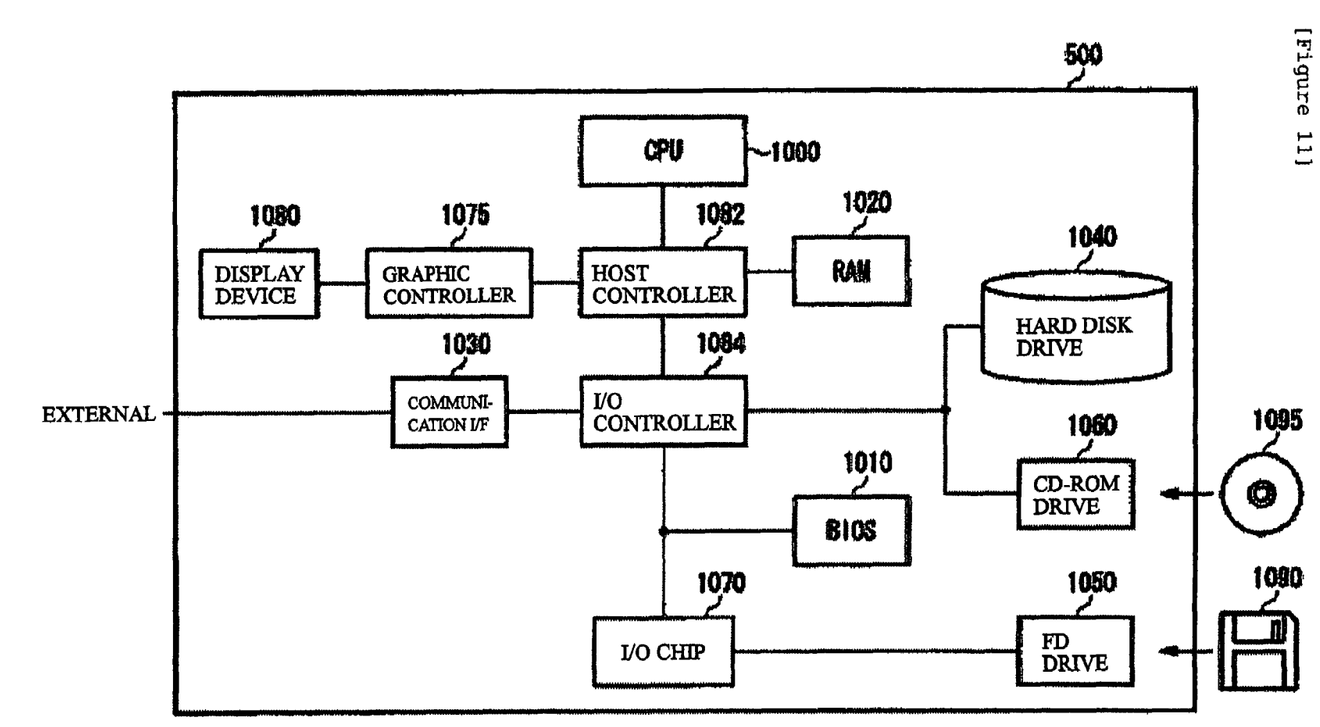
FIG. 11 shows an example of a hardware configuration of an information processing unit 500 that functions as the analyzing system 30.

FIG. 11 shows an example of a hardware configuration of an information processing unit 500 that functions as the analyzing system 30. The information processing unit 500 has a CPU peripheral units including a CPU 1000, RAM 1020, and a graphic controller 1075, which are connected to each other via a host controller 1082, an input/output unit including a communication interface 1030, a hard disk drive 1040, and a CD-ROM drive 1060, which are connected to the host controller 1082 via an input/output controller 1084, and a legacy input/output unit including a BIOS 1010, a flexible disk drive 1050, and an input/output chip 1070, which are connected to the input/output controller 1084.

The host controller 1082 connects the RAM 1020 with the CPU 1000 and the graphic controller 1075, which access the RAM in a high transfer rate. The CPU 1000 operates based on a program stored in the BIOS 1010 and the RAM 1020 and controls each unit. The graphic controller 1075 obtains image data generated by the CPU 1000 or the like on a frame buffer provided in the RAM 1020, and displays it on the display device 1080. The graphic controller 1075 may include a frame buffer for storing image data generated by the CPU 1000 or the like, instead.

The input/output controller 1084 connects the host controller 1082 with the communication interface 1030, the hard disk drive 1040, and the CD-ROM drive 1060, which are relatively high speed input/output devices. The communication interface 1030 communicates with an external device via a network. The hard disk drive 1040 stores a program and data used by the information processing unit 500. The CD-ROM drive 1060 reads a program or data from the CD-ROM 1095 and provides it to the RAM 1020 or the hard disk drive 1040.

The input/output controller 1084 is connected with relatively low speed input/output devices such as the BIOS 1010, the flexible disk drive 1050 and the input/output chip 1070. The BIOS 1010 stores a boot program executed by the CPU 1000 when the information processing unit 500 starts, a program or the like which depends on hardware of the information processing unit 500. The flexible disk drive 1050 reads a program or data from the flexible disk 1090 and provides it to the RAM 1020 or the hard disk drive 1040 via the input/output chip 1070. The input/output chip 1070 connects with various input/output devices via the flexible disk 1090 or a parallel port, a serial port, a keyboard port, a mouse port or the like.

A program provided for the information processing unit 500 is provided by a user on a recording medium such as the flexible disk 1090, the CD-ROM 1095, an IC card or the like. The program is read out from the recording medium via the input/output chip 1070 and/or the input/output controller 1084 and installed on the information processing unit 500 and executed there. As operation the program causes the analyzing system 30 to perform is the same as the operation in the analyzing system 30 that is described in FIGS. 1 to 10, the description of the operation will be omitted.

The program shown above may be stored in an external storage medium. As a storage medium, an optical recording medium such as a DVD or a PD, a magnetic optical medium such as an MD, a tape medium, semiconductor memory such as an IC card or the like as well as the flexible disk 1090 and the CD-ROM 1095 may be used. A storage device such as a hard disk, RAM or the like provided for a server system connected to a dedicated communication network or the Internet can be used as a recording medium for providing a program for the information processing device 500 via a network.

Although the embodiments of the present invention have been described, a technical range of the present invention is not limited to the description of the embodiments mentioned above. It is apparent to those skilled in the art that the embodiments mentioned above may be changed or improved in various ways. It is apparent from the claims that the embodiments with such changes or improvements are also included in the technical range of the present invention.

The invention claimed is:

1. A detecting method for detecting a closed pattern, which is a maximum set of items common to a set of transactions, based on history information which records a set of items including targets of transaction processing as items for each transaction, comprising:

a step where an information processing unit records array variables where each of first closed patterns obtained for a first itemspace consisting of a predetermined set of items is considered as an element;

a selection step where the information processing unit selects items, which are not included in said first itemspace, as additional items;

an arrangement accessing step where the information processing unit reads the elements of said array variables recorded in the recording unit from the first element in sequence;

a generating step where the information processing unit sequentially generates an additional pattern by adding said additional item selected by the selection unit to said first closed pattern indicated by the element read by said array access unit;

a comparing step where the information processing unit obtains a set of transactions including the whole of said additional pattern by searching the transactions including any items included in said additional pattern generated by the generating unit from said history information in said database device; obtains a set of transactions including the whole of said first closed pattern by searching transaction including any items included in said first closed pattern from said history information in said database device; and compares the obtained set of transactions including the whole of said additional pattern with a set of transactions including the whole of said additional pattern obtained for each of said first closed patterns as the set of items;

a step where the information processing unit excludes an item(s) indicating said first closed pattern from said array variables, adds an element indicating a sum of sets of said first closed pattern and said additional pattern to a next of the end element of said array variables, and records the element, on condition that the set of transactions for said additional pattern compared by said comparing unit matches the set of transactions for any of said first closed patterns; and adds an element indicating said additional pattern to a next of end element of said array variables and records the element, on condition that the set does not match the other set; and a step where the information processing unit detects each of elements of the array variables recorded in said recording unit as a second closed pattern, which is a closed pattern in a second itemspace, by determining that a process for the whole of said additional pattern is completed, on condition that the element read by the arrangement accessing unit includes said additional item or on condition that said element is the end element of the array variables.

* * * * *